United States Patent Office 3,386,806
Patented June 4, 1968

3,386,806
ASSAY METHOD
Robert D. Kross, Bellmore, N.Y., assignor, by mesne assignments, to Isolated Beef Protein Supplements Inc., a corporation of New York
No Drawing. Filed Nov. 25, 1964, Ser. No. 414,021
5 Claims. (Cl. 23—230)

ABSTRACT OF THE DISCLOSURE

A method of determining ethylenediamine tetraacetic acid concentration in comminuted meat products involving the steps of first removing the fat therefrom, then extracting said acid from the residue with water, treating the aqueous solution with a water soluble nickel salt, precipitating the excess nickel with dimethyl glyoxime, removing the precipitate, digesting the supernatant with heat and then testing the supernatant for nickel.

---

The present invention relates to a method of quantitatively determining the presence of very small amounts of ethylenediamine tetraacetic acid in a mixture containing the same, especially food mixtures such as comminuted meat.

In accordance with the present invention reliance is had upon the extremely powerful capacity of ethylenediamine tetraacetic acid as an acid, salt or chelate with some metal other than nickel to keep one equivalent of nickel ion in solution despite the capacity of dimethylglyoxime to precipitate nickel ion which is not so solubilized. Accordingly, if one simply adds an excess of a soluble nickel salt and then precipitates nickel with an excess of dimethylglyoxime, the filtrate will contain only that amount of nickel ion which has been solubilized by ethylenediamine tetraacetic acid. This filtrate can be removed, digested with sulfuric acid, and then tested for nickel.

As a feature of the invention, the residual nickel content is determined by a colorimetric dimethylglyoxime procedure which provides an absorption reading which can be compared with a chart or graph of similar readings obtained by the analysis of specimens containing known additions of ethylenediamine tetraacetic acid.

Referring more particularly to the testing of food mixtures such as meat emulsions, the first task is to eliminate fats which can be achieved by extraction with liquid hydrocarbon such as hexane which does not dissolve the ethylenediamine tetraacetic acid. The residue is then homogenized with water and filtered and the filtrate is then reacted with an excess (on a molar basis based on said acid) of any water-soluble nickel salt such as nickel sulfate. Excess nickel beyond the solubilizing capacity of the ethylenediamine tetraacetic acid is then precipitated by adding dimethylglyoxime to the nickel salt-containing filtrate at an alkaline pH. The nickel chelate precipitate is then agglomerated with heat and removed by filtration.

The organic components of the filtrate are then destroyed by digestion as with a strong acid like sulfuric acid and hydrogen peroxide. When digestion has been completed, the solution of nickel salt is rendered alkaline and reacted with dimethylglyoxime and the nickel content determined by noting the absorbance of the solution at 430 m$\mu$.

The present assay procedure is of particular value in the determination of the proportion of ethylenediamine tetraacetic acid present in a meat emulsion which, in turn, can be used to calculate the amount of bovine protein concentrate containing a fixed amount of disodium ethylenediamine tetraacetic acid which has been incorporated in the meat emulsion. A suitable assay is illustrated in the following example:

EXAMPLE I (1) Homogenize 30–40 grams of the meat emulsion in a Waring Blendor with 75 milliliters of hexane. Decant the hexane and repeat the extraction to remove the fat. After discarding the hexane solutions, homogenize the remaining solids with 70 milliliters of water, blending for two minutes.

(2) Transfer the homogenate quantitatively to a centrifuge bottle and spin down the solids for 10 minutes. Filter the supernatant liquid through glass wool, washing the solids in the centrifuge bottle with two small portions of water. Discard the residue and refilter the combined solution through a Buchner funnel containing Whatman No. 42 paper.

(3) Collect the filtrate in a 150 milliliter volumetric flask or graduated cylinder, and bring to the 150 milliliter mark with washing. Based on the expected level of disodium ethylenediamine tetraacetic acid anti-coagulant in the original emulsion, select an aliquot of the solution containing 20 to 40 micrograms of anti-coagulant.

Caution: It is important to have the filtrate as clear as possible before the reaction is carried out. If the sample solution is to be stored for more than one hour before proceeding further, it should be refiltered.

(4) Transfer the necessary quantity of filtrate to a 30 milliliter beaker and add sufficient water to make 10 milliliters. Add 0.2 milliliter of 1.33 percent nickel sulphate ($NiSO_4 \cdot 6H_2O$) and allow the mixture to stand for 10 minutes. Make the solution alkaline, to a pH 9–10, with dilute ammonium hydroxide, and add 0.5 milliliter of a 1.5 percent ethanolic solution of dimethylglyoxime.

(5) Immediately heat to boiling to agglomerate the nickel chelate and filter through Whatman No. 42 filter paper, with washing, into a 100 milliliter Kjeldahl flask. Digest the filtrate to destroy organic matter by adding three drops of concentrated sulfuric acid and cautiously heating. When the mixture fumes, cool and add three drops of 30 percent hydrogen peroxide. Continue the digestion, repeating the addition of peroxide until the solution is clear.

(6) Cool and transfer, with washing, to a 100 milliliter beaker. Adjust to pH 7.0 with a pH meter, using the following consecutive dilutions of ammonium hydroxide: concentrated, 1 milliliter of concentrated to 50 milliliters, 1 milliliter of the latter to 100 milliliters. Transfer the solution to a 25 milliliter stoppered graduated cylinder and add 0.5 milliliter of saturated bromine water. Allow to stand for 30 minutes.

(7) Add four drops of concentrated ammonium hydroxide, mix, and then add 0.5 milliliter of the alcoholic 1.5 percent dimethylglyoxime. Mix thoroughly and read the absorbance at 430 m$\mu$ in 5 centimeter cells, using a reagent blank carried through the entire digestion procedure.

(8) Construct a calibration curve by adding 20, 50, 80 and 100 micrograms of disodium ethylenediamine tetraacetic acid to 30 milliliter beakers, bringing to 10 milliliters volume with water, and continuing the entire procedure through the precipitation, digestion and color reaction beginning with step 4. Th level of ethylenediamine tetraacetic acid present in the meat emulsion is estimated from the calibration curve and calculated based on the aliquot taken in step 3, and the sample size used. The results can be expressed in terms of disodium ethylenediamine tetraacetic acid, or can be calculated in routine fashion to any other desired form such as ounces of bovine protein concentrate per 100 pounds of meat emulsion as desired. Typical calibration points are as follows:

| Concentration of disodium ethylenediamine tetraactic acid per aliquot, micrograms: | Absorbance [1] |
|---|---|
| 20 | 0.098 |
| 50 | 0.288 |
| 80 | 0.478 |
| 100 | 0.595 |

[1] At 430 mμ in 5 centimeter cells.

The invention is defined in the claims which follow:

I claim:
1. A method for quantitatively determining the presence of very small amounts of an ethylenediamine tetraacetic acid in comminuted meat containing the same comprising removing fat by extraction in liquid aliphatic hydrocarbon, extracting said acid from the fat-free residue with water and filtering to remove water-insoluble components, reacting the filtrate with a molar excess of water-soluble nickel salt, precipitating the excess nickel in alkaline medium with dimethylglyoxime and filtering to remove the precipitate, digesting the filtrate to destroy the organic constituents thereof and release the remaining nickel and then testing for nickel.
2. The method of claim 1 in which said remaining nickel is reacted with dimethylglyoxime and the proportion of nickel is measured colorimetrically.
3. The method of claim 2 in which nickel is measured by its absorbance at 430 mμ.
4. The method of claim 1 in which said comminuted meat contains a bovine protein concentrate including a proportion of added disodium ethylenediamine tetraacetic acid.
5. The method of claim 1 in which said liquid aliphatic hydrocarbon is hexane.

References Cited

UNITED STATES PATENTS 2,560,935    7/1951    Dickinson _____ 260—412.8 X

OTHER REFERENCES

Harris et al.: Analytical Chemistry, vol. 24, pp. 1062–3 (1952).

Brintzinger et al.: Chemical Abstracts, vol. 37, p. 3685 (1943).

Nelson, et al.: "Application of EDTA to Titrimetric Determination of Nickel in Nonferrous Alloys," Analytical Chem., vol. 32, pp. 99–103, January 1960.

Snell et al.: "Colorimetric Method of Analysis," p. 298, D. Van Nostrand, N.Y., 1953 QD962113 1948 in P.O.S.L.

Allport et al.: "Colorimetric Analysis," p. 49, Chapman Hall LTD, London, 1957, QD113A4, 1957 in P.O.S.L.

MORRIS O. WOLK, *Primary Examiner.*

JOSEPH SCORRONEK, *Examiner.*

LI MEI, E. A. KATZ, *Assistant Examiners.*